UNITED STATES PATENT OFFICE.

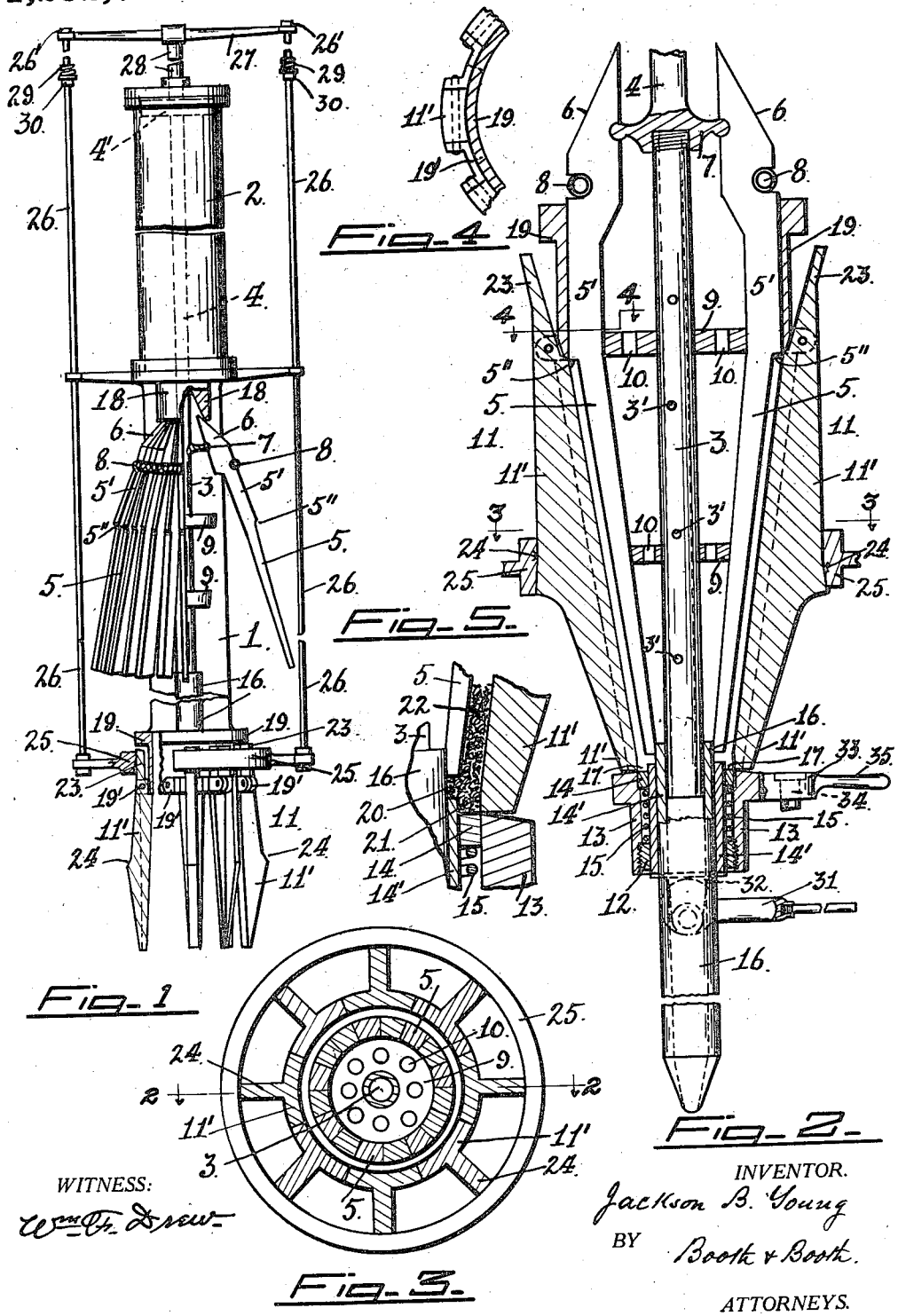

JACKSON B. YOUNG, OF OAKLAND, CALIFORNIA.

MACHINE FOR MAKING HOLLOW WARE FROM PULP.

1,252,761.

Specification of Letters Patent. Patented Jan. 8, 1918.

Application filed February 12, 1917. Serial No. 148,187.

*To all whom it may concern:*

Be it known that I, JACKSON B. YOUNG, a citizen of the United States, residing at Oakland, in the county of Alameda and State of California, have invented certain new and useful Improvements in Machines for Making Hollow Ware from Pulp, of which the following is a specification.

My invention relates to the class of machines for making hollow-ware from pulp, particularly conical shapes and especially milk-bottles.

In a previous and co-pending application Serial Number 131763, filed Nov. 16, 1916, I have disclosed a machine for this purpose in which a tapered inner mold composed of a circumferential series of swinging fingers moves into and out of a tapered outer mold.

My present invention particularly relates to this machine, and consists of certain improvements therein more especially directed to the tapered outer mold, its operation and effect, as I shall hereinafter fully describe by reference to the accompanying drawings, in which—

Figure 1 is an elevation, broken, of the machine the foot portions being omitted, and showing the inner mold lifted and its fingers spread, and the sections of the outer mold also spread.

Fig. 2 is a vertical section, on the line 2—2 of Fig. 3, showing the outer mold, the foot portions of the machine and the inner mold, all the parts being in molding relation.

Fig. 3 is a section on the line 3—3 of Fig. 2.

Fig. 4 is a detail section on the line 4—4 of Fig. 2.

Fig. 5 is a detail section, enlarged, of one side of the adjacent coacting surfaces of the molds and the end-abutment, showing their effect in making the neck of the article.

In describing my present machine as improved, I shall necessarily have to describe and illustrate in some detail, much that is set forth in the previous application above referred to.

In Fig. 1 the frame 1 carries a pressure cylinder 2 for operating the inner mold, by means of a tubular axis-rod 3 with an extension 4 passing up into the cylinder, as shown by the dotted lines, and having a piston 4' on its upper end. The inner mold is composed of a circumferential series of independent fingers 5 which when lying together give the mold the tapering shape of an inverted truncated cone. The heads 5' of these fingers are straight and they meet the tapered portion on a shoulder 5", and said heads are beveled at 6 at their upper ends. The fingers are connected with the axis-rod 3 by a collar 7 on the rod, and on this collar the heads 5' of the fingers freely fulcrum for swinging movement, and said heads are encircled by a spring 8, which holds the fingers in taper-mold shape.

9 are supports on the axis-rod 3, against which the fingers bear when together, as seen in Fig. 2. These supports are perforated at 10, for drainage of the excluded water surplus from the material, into the hollow rod 3 through holes 3' in said rod.

11 designates the outer mold as a whole. This mold also has the tapering shape of an inverted truncated cone, but in my present machine, said mold is composed of sections 11' in any suitable number, say eight, as shown in Fig. 3. These sections are individually pivoted in lugs 19' at the base of a straight cylindrical fixed top extension 19 of the outer mold. Above the pivots the sections have outwardly flaring heads 23.

At a suitable point between the pivotal lines of the sections and their lower ends, each section is formed or provided on its back or outer surface with a cam projection 24 inclining outwardly and downwardly.

Fitted around the outer mold 11 is a pressure ring 25 which is adapted for vertical movement by suitable means, as, for example, the rods 26, the cross-head 27 and the extension stem 28 of the piston 4'. As the movement of the cross-head 27 in the raising of the inner mold is much greater than the elevation of the pressure ring, said cross-head freely slips on said rods until it reaches their heads 26', when it picks them up. 29 are springs on the rods for cushion effect when the cross-head descends to the stops 30 of the rods to force them down again.

When the pressure ring is depressed it acts on the cam projections 24 of the mold sections to press and hold said sections in their taper-mold functional shape, as seen in Fig. 2; and when the ring is elevated it acts on the outwardly flaring heads 23 of said sections with the effect of spreading said sections, as seen in Fig. 1.

This spreading effect, if it be found desirable in order to avoid a too sudden or extensive relief of the product which is still relatively soft because it is not yet dry, may be gradual by causing some of said sections, say every alternate one, to begin to spread out slightly in advance of the others which still hold the product momentarily. This result can be readily attained by properly relatively shaping the section heads 23, as shown in Fig. 2, wherein the head of one section, namely the one on the left, is so shaped that the pressure ring 25 will engage it and begin to throw its section out, slightly before said ring engages the head of the section on the right; and it will be understood that the intervening section heads are alternately shaped like these two throughout the circumferential series.

13 is a cylindrical foot member coacting with the lower ends of the mold sections 11', and continuing the mold space for bottle neck. 14 is an annular yielding end-abutment which forms the bottom closure for the mold-space. A spring 15 carried on a screw collar 12 in the base of the foot member 13 supports this end-abutment. A tubular sleeve 14' lies within the abutment, passes down through the collar 12 of the foot member 13 and said sleeve is adapted to be closed by the plug-extension 16 of the axis rod 3 of the inner-mold, as will be hereafter described. The upper end of this plug extension forms the closure for the base of the inner mold, as seen in Fig. 2. The tubular sleeve is adapted for individual vertical movement, so that when elevated its upper end rises above the end abutment 14 and forms with the latter a rabbet 17, as seen in Fig. 2. To operate the sleeve, I show a cam lever 31, in the shape of a yoke hung from the foot member 13 and engaging a foot extension 32 of the sleeve. These parts, namely the foot-member 13, the yielding end-abutment 14 and the sleeve 14' are carried by an arm 33 which is pivoted at 34 and adapted by means of a handle 35 to be turned sidewise with the effect of swinging said parts under the molds for operation, and away from them when the molded product is to be dropped out, as will be presently described.

Under the base of the cylinder 2 is a fixed contact sleeve 18 for spreading the fingers of the inner mold. The cylindrical top extension 19 coacts with the straight-head portions 5' of the inner mold figures to impose a direct downward pressure on top of the material.

The operation of the machine is as follows:—When the parts are in the position shown in Fig. 1, the outer mold sections 11' are spread apart by the elevation of the ring 25, the foot members 13 and 14, though not shown are supposed to be in place under the mold, and the inner-mold fingers, by contact with the sleeve 18 are spread to clear them of any adhering material. The inner mold is now lowered and its fingers 5 being freed of the sleeve 18 are closed together by the spring 8 to taper mold shape. Then the sections of the outer mold are closed together to taper mold shape, by the descending ring 25, acting on their cam projections 24. When the inner mold has descended a distance sufficient to cause the plug extension 16 of the axis-rod 3 to enter and close the tubular sleeve 14' within the annular end-abutment 14, and before the fingers 5 reach the top extension 19, the pulp is poured into the top of said extension 19, until it fills the outer mold and said extension. Then the inner mold descends into the extension 19 and outer mold 11. Until the shoulder 5'' of the inner mold head reaches the top of the extension 19, the fluidic contents displaced by the entering mold overflows if sufficient volume be present, the top of said extension. The holding capacity of the outer mold 11 and head extension 19 and the displacement of the inner mold are so proportioned that when the shoulder 5'' of the inner mold head reaches the top of the extension 19, there will remain in the outer mold just enough pulp to make the product intended. The lower end of the inner mold being closed by the top of the plug extension 16, said mold will, as it continues down, force the pulp to fill the space between the two molds, all the way up to the descending shoulder 5''. As the descent continues, the mold space gradually grows thinner and shapes the product, the shoulder 5'' pressing down upon and condensing the upper end of the product, and the end-abutment 14 and sleeve 14' below, shaping and condensing its other end. The whole pressure is complete when the head-shoulder 5'' reaches the top of the tapered outer mold. The surplus water during this operation is squeezed inwardly between the mold-fingers 5 and drains out through the perforated axis rod 3 and its open ended hollow plug extension 16.

In the operation, the end-abutment 14 yields downward sufficiently to cause the pulp to be pressed inwardly under the lower end of the mold fingers and also to follow down in the straight foot member 13, thereby forming, as shown in Fig. 5, a neck for the molded product 22, which neck comprises an inner flange 20 and a cylindrical extension 21, due to the rabbet effect at 17 of the sleeve 14' and the abutment 14.

It must be explained that the article thus formed is upside down for its use as a milk-bottle, and, therefore, the end last described forms an efficient neck, in which upon the flange 20 a cover may be laid. The other or larger end of the article is of course open when taken from the machine, and must have its bottom applied in some manner with which I am not herein concerned.

When the molding is complete, the inner mold is lifted out, the tubular sleeve 14' is lowered and the whole foot structure is swung to one side; and the pressure ring 25 being lifted to the heads 23 of the outer mold sections 11', said sections spread outwardly, whereupon the molded product drops down. In lifting the inner mold, when the beveled extremities 6 of its finger heads reach the fixed sleeve 18, the fingers 5 are spread apart.

I claim:—

1. A machine for the described purpose comprising an outer mold formed of a plurality of sections; a fixed pivot upon which each of said sections, near one end thereof, is directly and freely suspended, adapting said sections, below the pivots, to swing inwardly to taper-shape for molding function, and outwardly away from taper-shape for relief of the molded product; means encircling and slidable upon the sections of the outer mold to swing them to and from taper-shape; a tapered inner mold; and means for moving said inner mold into the outer mold when the latter is in taper-shape, in order, by said movement, to compress the material between the two molds.

2. A machine for the described purpose comprising an outer mold formed of a plurality of sections; a fixed pivot upon which each of said sections, near one end thereof, is directly and freely suspended, adapting said sections, below the pivots, to swing inwardly to taper-shape for molding function, and outwardly away from taper-shape for relief of the molded product; means encircling and slidable upon the sections of the outer mold to swing them to and from taper-shape; a tapered inner mold; means for moving said inner mold into the outer mold when the latter is in taper-shape, in order, by said movement, to compress the material between the two molds; and means connecting the swinging means of the outer mold with the moving means of the inner mold to actuate said means in unison.

3. A machine for the described purpose comprising a tapered outer mold formed of a plurality of sections; a pivot connection enabling said sections to swing together for molding function and to spread apart to open the mold, each of said sections having an outwardly flaring head above its pivotal connection and a cam-projection below said pivotal connection; a movable pressure-ring encircling said mold and coacting with said heads and cam-projections to close and hold the mold sections together and to spread them apart; and a tapered inner mold movable into and out of the outer mold.

4. A machine for the described purpose comprising a tapered outer mold formed of a plurality of swinging sections adapted to close together for molding function and to spread apart to open the mold; and a tapered inner mold movable into and out of the outer mold and formed of a circumferential series of swinging fingers.

5. A machine for the described purpose comprising a tapered outer mold formed of a plurality of swinging sections adapted to close together for molding function and to spread apart to open the mold; means for pressing and holding said sections together and for spreading them apart; a tapered inner mold movable into and out of the outer mold, and formed of a circumferential series of swinging fingers; and means for spreading said fingers when withdrawn from the outer mold.

6. A machine for the described purpose comprising a tapered outer mold formed of a plurality of swinging sections adapted to close together for molding function and to spread apart to open the mold; a tapered inner mold movable into and out of the outer mold and formed of a circumferential series of swinging fingers; and an end-abutment for the mold space movable into and out of relation with the foot of the mold-space.

7. A machine for the described purpose comprising a tapered outer mold formed of a plurality of swinging sections adapted to close together for molding function and to spread apart to open the mold; means for pressing and holding said sections together and for spreading them apart; a tapered inner mold movable into and out of the outer mold and formed of a circumferential series of swinging fingers; means for spreading said fingers when withdrawn from the outer mold; an end-abutment to close the foot of the mold-space; and means for moving said end-abutment into and out of relation with said space.

8. A machine for the described purpose comprising a tapered outer mold formed of a plurality of swinging sections adapted to close together for molding function and to spread apart to open the mold; means for pressing and holding said sections together for molding function; means for opening for molding function; means for opening the mold adapted to initiate the spreading of some of its sections prior to starting the others; and a tapered inner mold movable into and out of the outer mold.

9. A machine for the described purpose comprising a tapered outer mold formed of a plurality of swinging sections adapted to close together for molding function and to spread apart to open the mold; means for pressing and holding said sections together for molding function; means for opening the mold adapted to initiate the spreading of its alternate sections prior to starting the intervening sections; and a tapered inner mold movable into and out of the outer mold.

10. A machine for the described purpose comprising a tapered outer mold formed of a plurality of swinging sections adapted to close together for molding function and to spread apart to open the mold; means for pressing and holding said sections together for molding function; means for opening the mold adapted to initiate the spreading of some of its sections prior to starting the others; and a tapered inner mold movable into and out of the outer mold and formed of a circumferential series of swinging fingers.

11. A machine for the described purpose comprising a tapered outer mold formed of a plurality of swinging sections adapted to close together for molding function and to spread apart to open the mold; means for pressing and holding said sections together for molding function; means for opening the mold adapted to initiate the spreading of some of its sections prior to starting the others; a tapered inner mold movable into and out of the outer mold; an end-abutment for the mold space; and means for moving said abutment into and out of relation with said space.

In testimony whereof I have signed my name to this specification in the presence of two subscribing witnesses.

JACKSON B. YOUNG.

Witnesses:
WM. F. BOOTH,
D. B. RICHARDS.